United States Patent [19]

Reed

[11] 4,387,361

[45] Jun. 7, 1983

[54] U-TURN VEHICLE LIGHT

[76] Inventor: Betty C. Reed, 11104 Waycroft Way, Rockville, Md. 20852

[21] Appl. No.: 235,700

[22] Filed: Feb. 18, 1981

Related U.S. Application Data

[63] Continuation-in-part of Ser. No. 792,719, May 2, 1977, abandoned.

[51] Int. Cl.³ .................... B60Q 1/34; B60Q 1/00
[52] U.S. Cl. ............................. 340/73; 340/84; 340/87; 340/96; 340/103; 340/107; 362/63; 362/66; 362/80
[58] Field of Search ................ 340/73, 84, 87, 96, 340/97, 106, 107, 100, 108, 103; 362/61, 63, 65, 66, 80; 116/42, 48, 49, 54, 202; 307/10 R, 10 LS

[56] References Cited

U.S. PATENT DOCUMENTS

| 2,831,176 | 4/1958 | Liberto | 340/96 |
| 2,843,836 | 7/1958 | McDonald | 340/84 |
| 3,128,448 | 4/1964 | Shumer et al. | 340/84 |
| 3,143,722 | 8/1964 | Murch | 340/84 |
| 3,213,419 | 10/1965 | Stutts | 340/84 |

Primary Examiner—Donnie L. Crosland
Attorney, Agent, or Firm—Frank L. Abbott

[57] ABSTRACT

A signal device for indicating a U-turn of a motor vehicle mounted on the vehicle for movement between an extended position above the hood of the vehicle and a stored position beneath the hood. The signal device includes a housing mounted on top of a rack in meshing engagement with a pinion drivingly connected to a reversible electric motor. The signal device is supported by a U-shaped bracket which may be attached to the hood of the automobile by tack welds and is supported solely by the relatively thin sheet metal of the hood. The housing has an inverted U-shaped window to expose a bulb mounted in a socket within the interior of the housing covered by a colored lens. When the bulb is activated, the lens will transmit light through the window to indicate to oncoming motorists that the vehicle operator intends to execute a turn. When retracted the top of the housing is flush with the sheet metal hood.

14 Claims, 8 Drawing Figures

U-TURN VEHICLE LIGHT

RELATED APPLICATION

This application discloses in part the subject matter of Application Ser. No. 792,719, filed May 2, 1977 now abandoned, for U-TURN VEHICLE LIGHT by Betty C. Reed (formerly Betty E. Cowan).

BACKGROUND OF THE INVENTION

This invention relates to a signal device, and more particularly, a signal light adapted to be mounted upon the hood of an automotive vehicle to provide a U-turn signal in addition to the normal turning light signals provided on the vehicle.

A vehicle operator presently does not have any mechanical signal means associated with an automotive vehicle for indicating a U-turn in addition to the normal left, right, or hazard warning signals provided on the vehicle. Accordingly, this invention provides such a signal device. The device may be mounted directly on the hood of the vehicle and may be installed by the vehicle operator or the manufacturer of the vehicle, by the use of relatively inexpensive bracket means. The bracket and signal device are supported solely by the relatively thin sheet metal of the hood.

The following U.S. Pat. Nos. were cited in the related application: Ser. No. 792,719 filed May 2, 1977, 1,469,080; 1,515,061; 1,563,258; 1,580,218; 2,453,421; 2,601,115; 2,807,795; and 2,851,674. The only one of these patents which is deemed pertinent appears to be the patient to Dyer, 2,453,421 which discloses at 20 a U-turn indicator. Also of record in the related application are the patents to Liberto 2,831,176 and Shumer 3,128,448. Shumer discloses a rack and pinion means to raise and lower a rear window blinker light. Reading Dyer and Shumer in the light of this disclosure, it will become clear that they do not function in the disclosed environment, do not disclose the combination of this application, do not solve the problem which this invention is solving and do not disclose the details of the signal device which will be subsequently described.

SUMMARY OF THE INVENTION

The first object of this invention is to promote highway safety by means of a signal device to indicate that the driver of a vehicle intends to execute a U-turn.

Another object is to construct a signal device which is light in weight and relatively inexpensive to manufacture and may be supported solely by the relatively thin sheet metal of the hood of the vehicle.

The invention also has as its object to provide a signal device which will not affect the appearance of the vehicle when retracted to a position of non use.

A further object is to provide a signal device which will occupy otherwise unused space beneath the hood of the vehicle.

In accordance with the invention, the U-turn signal light device includes an aerodynamically shaped housing having an inverted U-shaped window in the front thereof. A colored lens is connected to a socket containing a bulb within the housing and is viewable through the front window. The housing is mounted on an elongated bar containing a plurality of rack teeth intermediate its ends which is supported beneath the hood of the vehicle. The rack is in meshing engagement with a pinion adapted to be rotated by a reversible electric motor mounted beneath the hood of the vehicle, such as on the fire wall.

When not in use, the rack can be lowered to lower the U-turn signal housing to a position substantially flush with the top of the hood. In use, the rack can be raised by the pinion and motor above the hood of the vehicle and the light bulb within the housing surrounded by the colored lens activated to serve as a warning signal to approaching motorists that the vehicle operator tends to make a U-turn.

The exterior housing of the U-turn light signal is oval shaped having its major axis in the direction of travel of the vehicle so as to aerodynamically deflect air about the housing to preclude the housing and its support from both impending travel of the vehicle and from blowing over.

The housing, motor and rack assembly are supported solely by the sheet metal hood by means of a substantially U-shaped bracket having flanges which may be secured to the underside of the hood by means of tack welds.

BRIEF DESCRIPTION OF THE DRAWING

Further objects and advantages of the invention will become apparent from the accompanying drawing, wherein.

DETAILED DESCRIPTION OF THE PREFERRED EMBODIMENT

Figure 1:
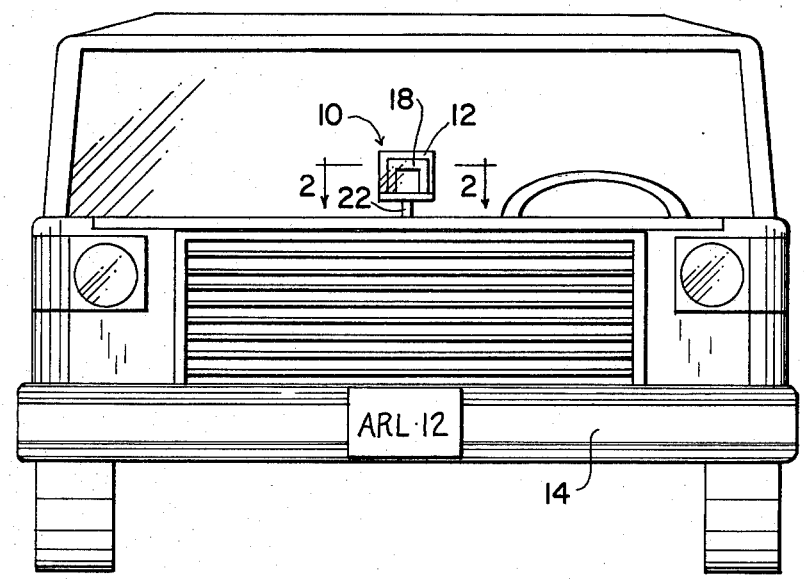
FIG. 1 is a front view in elevation of a vehicle provided with the U-turn signal light of the present invention.

Referring now to the drawing in detail, wherein like numerals indicate like elements throughout the several views, the U-turn signal light device 10 of the present invention includes an oval shaped outer housing 12, which is elliptical in cross-section, and has a major dimension or axis extending in the direction of travel of a vehicle on which it is mounted, such as a vehicle 14.

Figure 2:
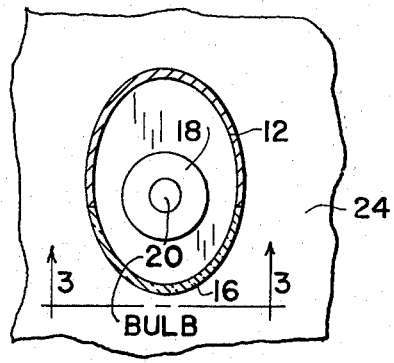
FIG. 2 is a cross-sectional view taken substantially along the plane indicated by line 2—2 of FIG. 1.
Figure 3:
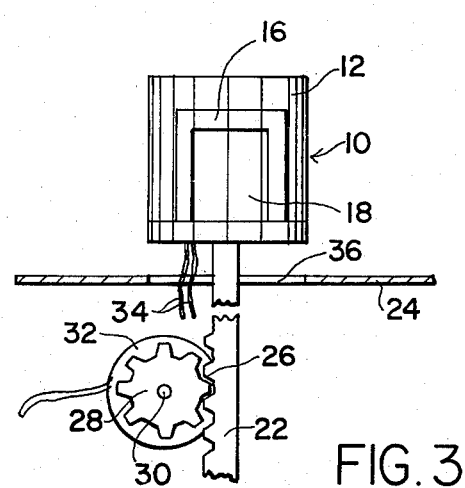
FIG. 3 is a cross-sectional view taken substantially along the plane indicated by line 3—3 of FIG. 2.

Housing 12 includes an inverted U-shaped window 16, FIGS. 2 and 3, cut in its front survace to expose to view a colored cylindrical lens 18 mounted on a socket adapted to threadedly receive a bulb 20. Lens 18 is translucent so that when bulb 20 is activated, light can be observed through the lens 18 and through window 16 projected as an inverted U.

Figure 6:
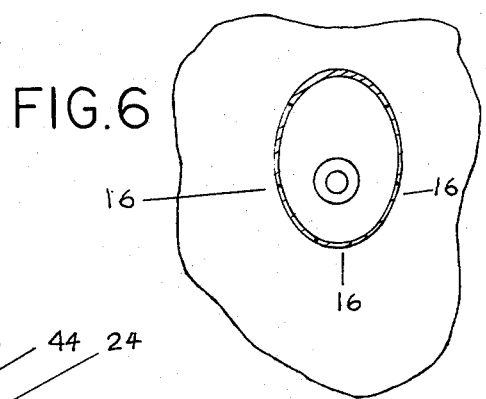
FIG. 6 is a sectional view showing a modification in which lens and U-shaped windows are in the sides of the housing as well as the front.

Another embodiment of the invention is illustrated in FIG. 6. In this embodiment additional windows 16 are placed in the sides of the housing as well as the front whereby light from bulb 20 shines through the lens 1 and windows 16 to indicate to vehicles paralled with the vehicle 14 that the driver of vehicle 14 is planning to execute a U-turn.

Figure 4:
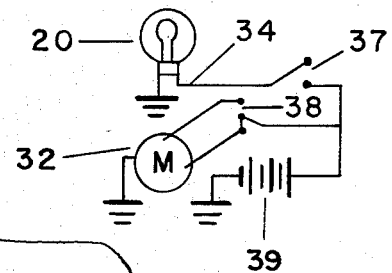
FIG. 4 is one form of conventional circuitry which may be used to activate the light and motor.

As shown in FIG. 4 motor 32 can be connected to a suitable power source such as the vehicle battery 39 by wires (unnumbered) and the socket mounting bolt 20 can also be connected to the vehicle battery by wires 34.

Figure 5:
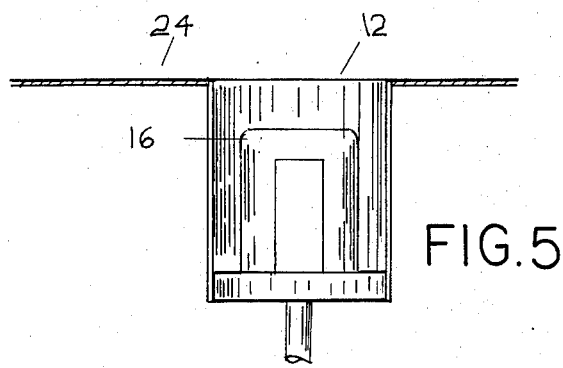
FIG. 5 is a view taken from the front of the car looking rearwardly showing the housing in retracted position.

Normally, motor 32 can be activated by a switch on the dash of the vehicle to cause pinion 28 to lower bar 22 in meshing engagement with the teeth 22 so that the top of housing 12 is flush with the top of hood 24 as shown in FIG. 5. Housing 12 is then lowered through an opening 36 in hood 24 to store housing 12 within the interior of the hood of vehicle 14.

Motor 32 is reversible so that upon activation of a switch on the dash, the motor will rotate in the opposite direction raising the bar 22 and housing 12 above the hood of the vehicle 24 as shown in FIG. 3. A second switch (37) on the dash can then be closed to activate bulb 20 illuminating lens 18 making it visible as an inverted U-shape through window 16 of housing 12 to warn on-coming motorists of the intent of the vehicle operator to execute a U-turn.

The elliptical cross-section of housing 12 will aerodynamically deflect air past housing 12.

In order to prevent distraction from concentration on driving when not in use, pinion 28 will lower bar 22 and housing 12 to its stored position beneath the hood of the vehicle with the top of the housing 12 substantially flush with the upper surface of the hood 24.

Housing 12 is secured and supported by an elongated bar 22 adapted to extend through the hood 24 of vehicle 14. Bar 22 can be slidably supported in a bracket (40) attached to the sheet metal hood 24 of the vehicle. Bar 22 includes a plurality of rack gear teeth 26 along one surface thereof in meshing engagement with a pinion 28 drivingly connected by a shaft 30 to a reversible electric D.C. motor 32.

Bracket 40 comprises a bight portion 41, side portions 42 and wings or flanges 43 or 44. The bight portion 41 has a substantially L-shaped opening having a foot portion 45 with a lateral dimension less than the motor housing whereby a portion of the housing may be received therein and secured to the bracket by means of tack welds 46.

The rack 22 passes through and moves freely through a leg portion 47 of the L-shaped opening. If desired a short tube or bearing may be affixed to the underside of the bracket to guide the bar 22.

Figure 7:
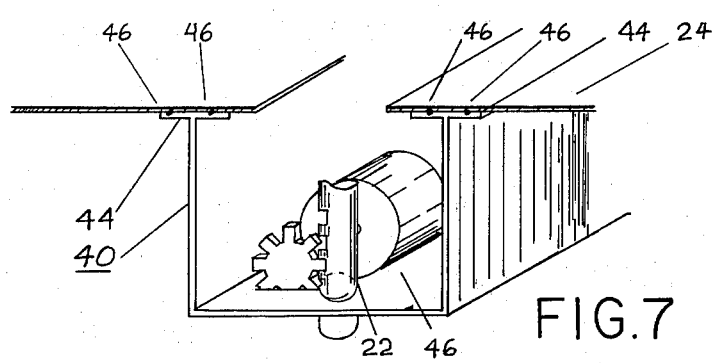
FIG. 7 illustrates the motor and rack supported beneath the hood by a U-shaped bracket.
Figure 8:
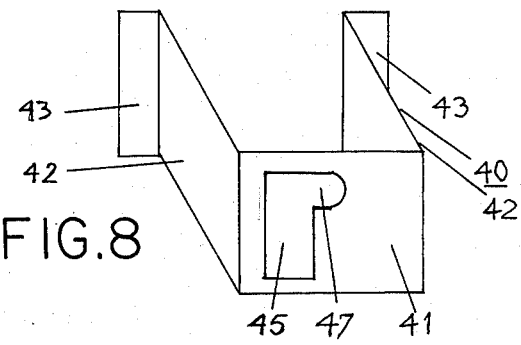
FIG. 8 is a view of the bracket with an opening therein for receiving the motor and rack.

As shown in FIG. 7, the flanges or wings are secured to the underside of the relatively thin sheet metal hood 50 by tack welds 46 or other suitable securing means.

While a specific embodiment of a U-turn vehicle signal light has been disclosed in the foregoing description, it will be understood that various modifications within the spirit of the invention may occur to those skilled in the art. Therefore, it is intended that no limitations be placed on the invention except as defined by the scope of the appended claims.

I claim:

1. A signal device adapted to be mounted beneath a motor vehicle hood for indicating a U-Turn to oncoming traffic comprising: a housing, said housing having a front surface, means through said front surface of said housing to indicate to oncoming motorists the intent of a driver to execute a U-Turn, a socket in said housing for receiving a light bulb, and means adapted to be mounted beneath and supported by a vehicle hood for raising and lowering said housing, said means for raising and lowering said housing comprising a reversible motor means, a pinion mounted for rotation by said motor and a rack attached to and supporting said housing in meshing engagement with said pinion.

2. The signal device of claim 1 wherein said housing has an elliptical cross section with its major axis in the direction of travel of the vehicle and a top portion conforming to the shape of the hood.

3. The signal device of claim 1 wherein a colored lens is interposed between said socket and said means through the front surface of said housing and said means through said front surface of the housing comprises a transparent window of inverted U-shape.

4. The signal device of claim 1 wherein a lens is interposed between said light bulb receiving socket in said housing and the means for indicating to oncoming motorists the intent of the driver to execute a U-Turn.

5. The signal device of claim 1 in which the device is mounted forward of the position of the driver.

6. The signal device of claim 1 in which the housing and means for raising and lowering said housing are supported beneath the hood by a U-shaped bracket.

7. A signal device for vehicles having a housing elliptical in section comprised of a vertical substantially elliptical shaped surface and a substantionally horizontal top surface, means through said vertical surface of said housing to indicate to drivers of vehicles, the intention of a driver of a signal bearing vehicle to make a change in the direction of motion of his vehicle, means in said housing for receiving a light source, means for raising and lowering said housing, said means being secured to a support means for supporting said device on a vehicle hood wherein the support means comprises a substantially U-shaped bracket having means attaching the means for raising and lowering the housing thereto and means for attaching the bracket underneath a vehicle hood.

8. The signal device of claim 7 in which the means through the vertical surface of said housing comprise a means to indicate to the other traffic the intention of the driver to execute a U-turn.

9. The signal device of claim 7 in which means through the vertical surface comprises windows through the front and the sides of said vertical surface.

10. The signal device of claim 9 in which at lease some of the windows through the front and sides of the housings include means to indicate the intention of the driver to execute a U-turn.

11. The signal device of claim 10 in which the means to indicate the intention of the driver to execute a U-turn comprises the said windows being of an inverted U-shape.

12. Signal device adapted to be mounted beneath a motor vehicle hood comprising: a housing having an elliptical substantially verticle wall portion, and a substantially horizontal top portion, a forward portion of said vertical wall having an inverted U-shaped transparent window therein, a light bulb receiving socket in said housing and a lens interposed between the socket and vertical wall of said housing whereby when a light bulb is activated the beam shining through the window will indicate a driver's intention to execute a U-turn, means for raising and lowering said housing comprising a reversible motor, a pinion driven by said motor and a rack meshing with said pinion secured to said housing whereby the housing may be raised to a position exposing the inverted U-shaped window to view above a hood and lowered to a position where the top of the housing is substantially flush with a vehicle hood; the motor is secured to a bight portion of a substantially U-shaped bracket, said bracket having means thereon to secure the legs of said U-shaped bracket to the underneath side of the hood.

13. The signal device of claim 12, wherein the bight portion of the bracket has a substantially L-shaped opening therethrough having a leg and a foot, the foot of said opening being narrower than the diameter of the motor whereby the motor may be secured in the opening by fastening means; the leg of the opening receiving the rack whereby the rack may be moved through and relative to the bight portion.

14. The signal device of claim 12 wherein the side portions of the vertical wall portion of the housing also have inverted U-shaped transparent windows therein.

* * * * *